A. DOLLASON & C. L. LEONARD.
Front-Gear for Carriages.

No. 203,326. Patented May 7, 1878.

WITNESSES:
Henry N. Miller
C. Sedgwick

INVENTOR:
A. Dollason
C. L. Leonard
BY
ATTORNEYS.

UNITED STATES PATENT OFFICE.

AUSTIN DOLLASON AND CHARLES L. LEONARD, OF FACTORYVILLE, N. Y.

IMPROVEMENT IN FRONT GEAR FOR CARRIAGES.

Specification forming part of Letters Patent No. 203,326, dated May 7, 1878; application filed March 27, 1878.

*To all whom it may concern:*

Figure 1:
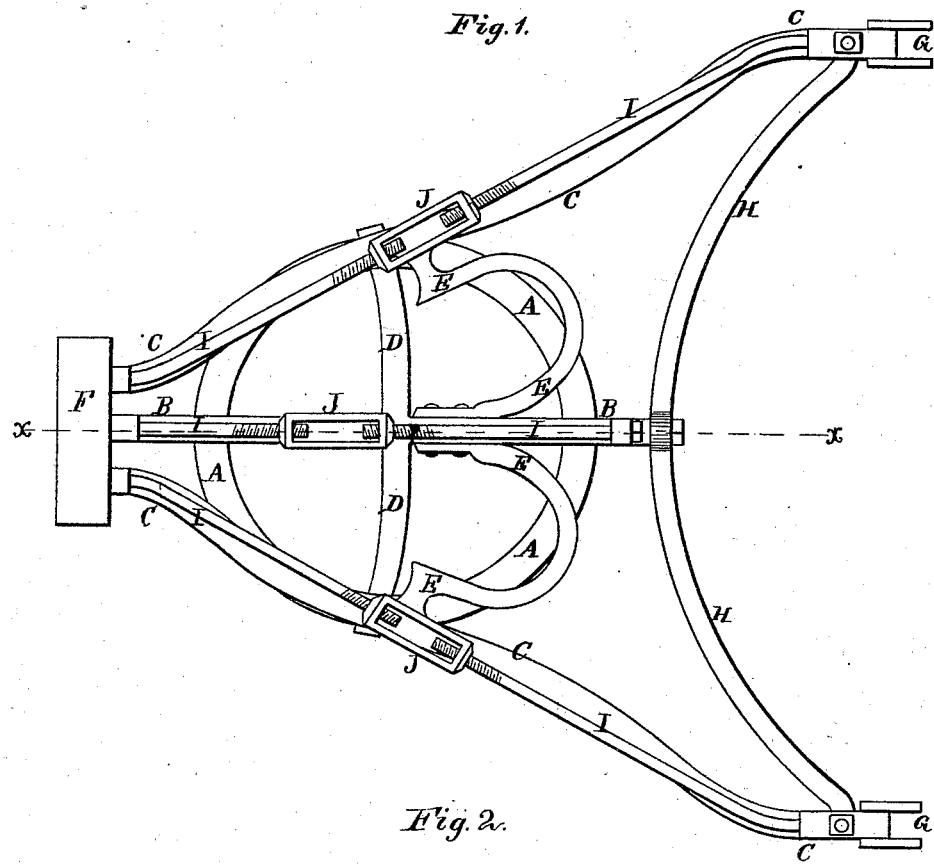
Figure 2:
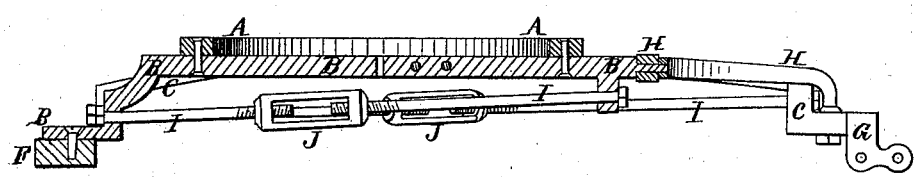

Be it known that we, AUSTIN DOLLASON and CHARLES L. LEONARD, of Factoryville, in the county of Tioga and State of New York, have invented a new and Improved Front Gear for Carriages, of which the following is a specification:

Figure is a bottom view of our improved front gear. Fig. 2 is a vertical longitudinal section of the same, taken through the line $x$ $x$, Fig. 1.

Similar letters of reference indicate corresponding parts.

The object of this invention is to improve the construction of the front gear for carriages for which Letters Patent No. 126,720 were granted to Charles L. Leonard May 14, 1872, so as to prevent it from sagging or settling in the center, and which shall be simple in construction, convenient in use, and effective in operation.

The invention will first be described in connection with the drawing, and then pointed out in the claim.

A is the lower or movable part of the fifth-wheel, which is attached to the central bar B and the two side bars C. The center bar B, at the center of the circle A, is perforated to receive the king-bolt, and is strengthened by the cross-bar D, the ends of which are attached to the side bar C. The bars C B C are further strengthened against lateral movement by the U-bars E, the inner ends of which are attached to the opposite sides of the bar B in front of its center, and their outer ends are attached to the side bars C a little in front of the cross-bar D. The rear ends of the three bars C B C are bent downward and rearward, and are bolted to the block F, to which the center of the cross-spring is designed to be attached. The side bars C project outward and forward, and their ends are bent downward and forward, and have lugs or couplings G formed upon or attached to them to receive the pole or thill-irons and the forward ends of the side springs. To the forward end of the center bar B is attached the center of a curved brace-bar, H, the ends of which are attached to the forward ends of the side bars C. To the downwardly-projecting parts of the ends of the center and side bars B C, and to a short downwardly-projecting stud or arm attached to the forward end of the said center-bar B, are attached the ends of the three tension-rods I. The tension-rods I are each made in two parts, and the adjacent ends of the said parts have right and left screw-threads cut upon them to fit into the right and left screw-threads cut in the opposite ends of the long nuts J, so that by turning the said nuts more or less arch may be given to the bars C B C, and their ends may be firmly held against spreading, to prevent the frame from sagging or settling in the center, and enable it to support a much greater weight than it otherwise could.

If desired, the nuts J may be screwed upon the end of one part and swiveled to the end of the other part of the rods I; but we prefer the construction first described, as enabling the adjustment to be made quicker and with less effort.

Having thus fully described our invention, we claim as new and desire to secure by Letters Patent—

The cross-braces D E E, combined with the bars C B C, curved bar H, tension-rods I I, and nuts J, substantially as and for the purpose specified.

AUSTIN DOLLASON.
CHARLES L. LEONARD.

Witnesses:
MILTON J. WARNER,
P. P. GALLAGHER.